May 19, 1925. 1,538,017
W. C. WRIGHT
QUICK RELEASE APPARATUS FOR AIR BRAKE CYLINDERS
Filed March 24, 1924
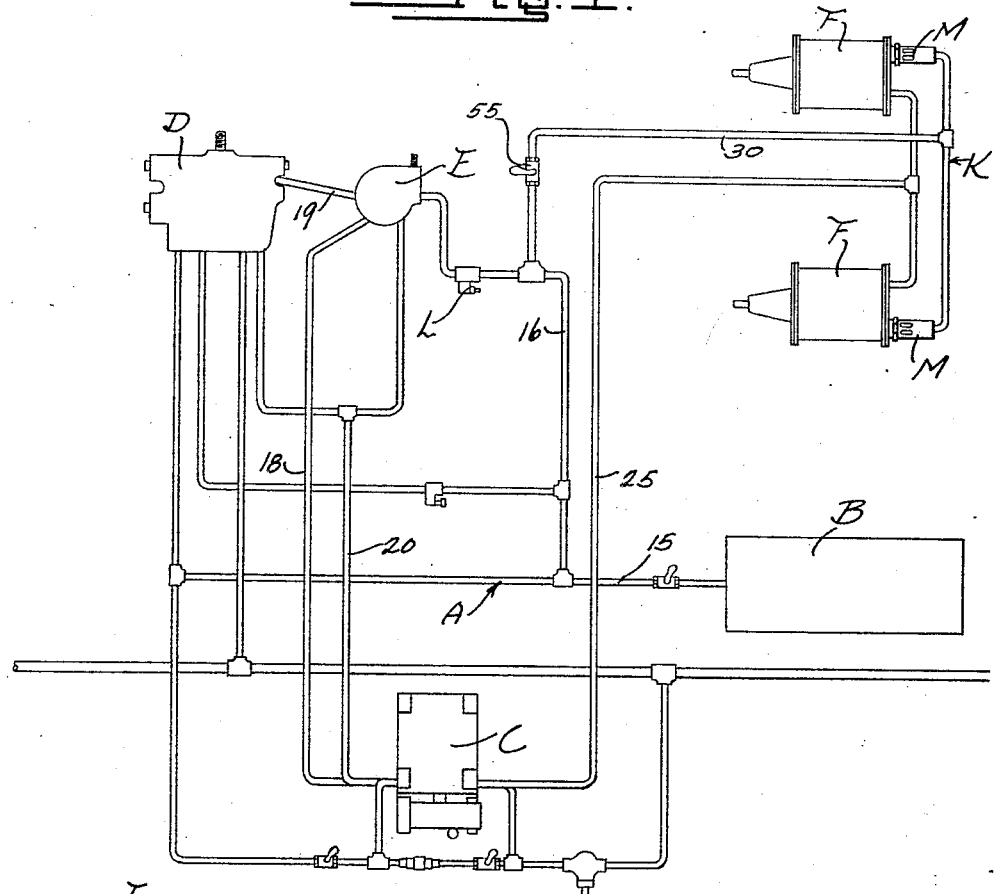
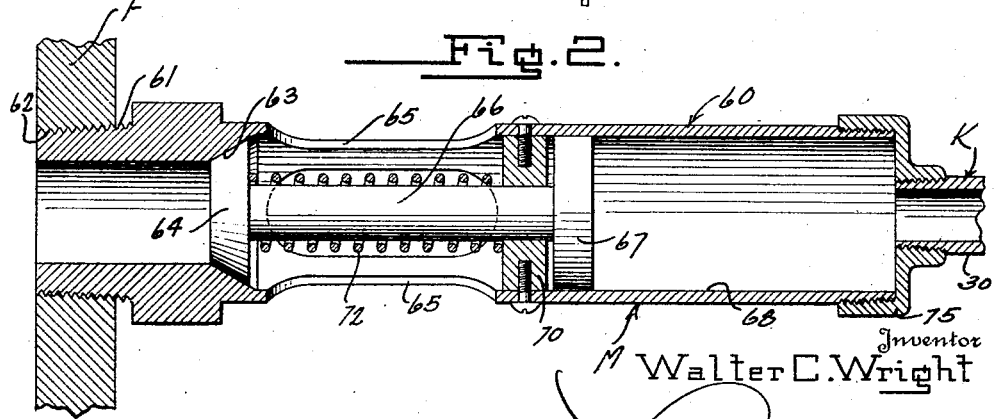
Inventor
Walter C. Wright Patented May 19, 1925.

1,538,017

UNITED STATES PATENT OFFICE.

WALTER C. WRIGHT, OF YOUNGSTOWN, OHIO.

QUICK-RELEASE APPARATUS FOR AIR-BRAKE CYLINDERS.

Application filed March 24, 1924. Serial No. 701,525.

*To all whom it may concern:*

Be it known that I, WALTER C. WRIGHT, a citizen of the United States, residing at Youngstown, in the county of Mahoning and State of Ohio, have invented certain new and useful Improvements in Quick-Release Apparatus for Air-Brake Cylinders, of which the following is a specification.

This invention relates to an improved means for the quick release of air pressure from the air brake cylinders of an air brake system, to permit of instantaneous release of a brake application.

The primary object of this invention is the provision of an improved quick release mechanism for the drive brake cylinders of locomotives, and the like, embodying a quick release valve for each brake cylinder which is normally maintained in a closed relation by air pressure, and which air pressure may be so regulated as to permit quick release of air pressure from the brake cylinder.

A further object of this invention is the provision of quick release mechanism for permitting the escape of air pressure from air brake cylinders, which is used in a novel manner in connection with conventional air brake systems.

A further object of this invention is the provision of a novel type of quick release valve which may be used in connection with the quick release means above mentioned.

A further and important object of this invention is the provision of quick release apparatus for use in connection with air brake cylinders of braking equipment, which may be used to instantaneously release air pressure in the brake cylinders, to quickly release a brake application, and thereby preventing locking of locomotive and truck wheels, as is now sometimes the case where the distributing valve is slow in operation.

Other objects and advantages of this invention will be apparent during the course of the following detailed description.

In the accompanying drawing, forming a part of this specification, and wherein similar reference characters designate corresponding parts throughout the several views, Figure 1 is a diagrammatic representation of approved braking equipment used in connection with the improved quick release apparatus.

Fig. 2 is a fragmentary cross sectional view taken through the improved details of the quick release valve, showing its association with an air brake cylinder.

In the drawing, wherein for the purpose of illustration is shown the preferred embodiment of the improved quick release apparatus for the brake cylinders of air brake systems, the letter A may generally designate the locomotive brake equipment of any conventional system, which includes an air reservoir B; distributing valve C; automatic brake valve D; independent brake valve E; driver brake cylinders F; and the quick release apparatus K associated with details of the brake equipment A.

The operation of the braking equipment illustrated in diagrammatic form in Figure 1 of the drawings is well known to those skilled in the art to which this invention relates. A conduit or pipe 15 leads from the main reservoir B, and connects by means of a conduit 16 with the independent brake valve E. The pipe line 15 furthermore extends for connection with the automatic brake valve D and the distributing valve C, in the well known manner. The distributing valve release pipe 18 extends from the independent brake valve E to the distributing valve C with the well known connections between these elements. A pipe line 19 also connects the independent brake valve E with the automatic brake valve D, with the conventional port connections therein. The application cylinder pipe 20 extends for connection with the distributing valve C, having the conventional port connections therein, and the same extends for connection with the independent brake valve E, having the conventional port connections therein. The application cylinder pipe 20, of course, has the conventional port connections with the automatic brake valve D. A pipe 25 leads from the distributing valve C, having conventional port connections therewith, and extends for connection with the driver brake cylinders F, in conventional mannner, for purpose of feeding air pressure to the cylinders F for effecting brake applications. Other conduit or pipe line connections from the automatic brake valve D and the distributing valve C, may be made with various elements of the brake equipment A, in accordance with the conventional construction of air brake systems, well known to those skilled in the art to which this invention relates.

Referring generally to the improved quick release apparatus K, a novel exhaust or release valve construction M is provided upon each of the brake cylinders F, which are connected by means of a conduit 30 which leads to the conduit 16. A three way valve 55 is provided in the conduit 30, so that main reservoir air pressure may be applied to the conduit 30 for holding the release valves M closed, or for release of air pressure from the conduit 30 to release or permit opening of the exhaust valves M. The specific principle involved in the operation of the quick release valve of my present invention consists in the feeding of air reservoir pressure into the conduit 30, by means of the three way cock 55, so that this air pressure operates upon each of the quick release valves M to hold them seated, notwithstanding the fact that air pressure exists in the driver brake cylinders F for effecting a brake application. Of course, the air pressure in the brake cylinders F is less than the air pressure in the conduit 30, during closing of the release valves M.

In the conventional air brake system a reducing valve L is placed in the line 16 between the air reservoir and the independent brake valve, so that reduced air pressure may be fed to the distributing valve. As it is desired to feed a high air pressure into the line 30 for maintaining the release valve M closed, the conduit 30 connects with the conduit 16 between the reducing valve and the main reservoir.

Referring to the preferred construction of the release valve M, and as is illustrated in Figure 2 of the drawings, a housing or casing 60 is provided, which at one end thereof is provided with a screw threaded tubular connection 61 which is adapted for insertion in a screw threaded opening 62 in the brake cylinder F. A tapered valve seat 63 is provided in the casing or housing 60, disposed in a converging relation toward the connecting end 61, upon which the tapered valve head 64 seats. In the casing 60, outwardly of the seat 63, a plurality of longitudinally extending openings 65 are provided, which communicate the interior of the casing with the atmosphere, and through which air pressure escapes from a cylinder F during unseating of the valve head 64 from its seat 63.

Connected to the valve head 64, is a piston rod 66, which supports a piston head 67 slidable in the compartment 68 of the housing 60 to the rear of the ports 65; a bearing block 70 preferably being provided in the compartment 68 for slidably receiving the rod 66 therethrough with a loose fit. A spiral spring 72, of any desired compression is provided, which at one end engages the bearing block 70, and at the other end engages the valve head 64 for the purpose of seating the latter. At the extreme outer end of the casing 60, a coupling 75 connects the air line 30 to the valve structure M.

In operation, during "running"; "lap"; "slow application"; or "quick application" of the independent brake valve, air pressure from the reservoir line 16 is permitted to enter the line 30, and this air pressure enters the casing 60 of the release valve M to the rear of the piston 67, and acting on the piston 67 forces the same to maintain the valve head 64 closed on its seat 63. Of course, the spring 72 assists in maintaining the valve 64 closed, but the air pressure is the primary impelling force for such operation. The air pressure entering the brake cylinder F to effect a brake application is less than the air pressure existing in the line 30, incident to the reducing valve provided in the air brake system, and it can readily be understood that the air pressure on the brake cylinder side of the valve head 64 is less than the air pressure on the opposite side thereof, so that the valves M will be maintained closed in the operating positions above mentioned. When the three way cock 55 is operated to open the line 30 between the cock 55 and valves M to the atmosphere, air pressure in the line 30 is immediately exhausted, and the air pressure on the brake cylinder side of the valve head 64 is then greater than the air pressure on the opposite side thereof, so that the valve head 64 is unseated and the air pressure from the brake cylinder may escape through the casing ports or openings 65 to the atmosphere almost instantaneously.

From the foregoing description of this invention and the operation thereof, it can well be understood by those skilled in the art to which this invention relates that the quick release system is of great importance for many reasons. Because of the slow release of the ordinary air brake system, the driving wheels of locomotives are very often locked, incident to slow operation of the distributing valve, or "gumming" or sticking of the parts thereof, so that the driver wheels of the locomotive very often wear a flat surface. This wearing of the locomotive wheels, or other car wheels is a considerable offence, incident to the high maintenance and replacement cost. The valve parts and the arrangement for their operation is very simple, and will operate efficiently under all practical conditions.

The application of the improved air pressure release valve for brakes may be made to various systems. It is the primary purpose of the invention in connection with the application of the invention to any air brake system, that air pressure from a supply source be used to hold the quick release valve seated to prevent air pressure from the brake cylinders to escape. When the air pressure from the supply source is then released or reduced with respect to its application on the release valve the air pressure in the brake cylinders is then sufficient to unseat the valve and escape for releasing the brake application.

As air pressures are sometimes equal in the brake cylinders and main reservoir, the spring 72 will aid the main reservoir pressure in maintaining the release valve closed during a brake application.

Various changes in the shape, size, and arrangement of parts may be made to the form of the invention herein shown and described, without departing from the spirit of the invention or the scope of the claims.

I claim:

1. In combination with an air brake cylinder, quick release exhaust valve means for the brake cylinder, air pressure means normally retaining the exhaust valve seated, and means for lowering the air pressure in said last mentioned means to open the exhaust valve for discharge of air from the brake cylinder for releasing a brake application.

2. In combination with an air brake cylinder, means for supplying air pressure to the cylinder to effect a brake application, exhaust valve means for the brake cylinder, air pressure means operating on said exhaust valve to close the same when greater than the air pressure in the brake cylinder, and means for lowering the air pressure of said last mentioned means to permit air pressure in the brake cylinder to open the exhaust valve for discharge of air from the brake cylinder for releasing a brake application.

3. In an air brake system the combination of an air brake cylinder, a distributing valve for feeding air to the brake cylinder for effecting a brake application, a quick release valve independent of the distributing valve for escape of air pressure from the brake cylinder, means for supplying air pressure to hold the release valve closed, and means for lowering the air pressure of said last mentioned means to permit opening of the exhaust valve incident to air pressure in the brake cylinder for escape of said brake cylinder air pressure.

4. In an air brake system the combination of an air brake cylinder, an air reservoir adapted to contain air under pressure, means for feeding said air from the reservoir into the air brake cylinder under a pressure, less than air reservoir pressure, a release valve for the brake cylinder, means for feeding air pressure from the reservoir to the release valve under greater pressure than exists in the brake cylinder for maintaining the release valve closed, and means for lowering the pressure which tends to seat said release valve to a point below pressure in the brake cylinder whereby the release valve will be unseated to permit escape of pressure from the brake cylinder.

5. In a quick release valve for air brake cylinders the combination of a housing including a forward brake cylinder connecting end, said housing intermediate its ends having air release ports therein, a tapered valve seat in the housing between the air release ports and the cylinder connecting end thereof tapering in converging relation toward said connecting end, a valve head for seating in said tapered seat, and piston means operating in said housing and connected to said valve head.

6. In a valve structure of the class described the combination of a housing providing air release ports therein with a tapered seat to one side of said air release ports, and a bearing block to the opposite side of said air release ports, a valve head seated on said valve seat, a piston slidable in said housing, a piston rod supported in said bearing block and connected to said piston and to said valve head, and spring means under compression between said bearing block and valve head to normally maintain the latter seated.

7. In an air brake system a brake cylinder, an air pressure supply, means for feeding air pressure from the supply to the brake cylinder to effect brake application, quick release valve means having communication with the brake cylinder, means connecting the quick release valve means with the air pressure supply so that air pressure of the supply acts on the quick release valve means to close off escape of air pressure from the brake cylinder through the quick release valve means, and valve means for the last mentioned means by which air pressure therein is released to the atmosphere to permit air pressure in the brake cylinder to open the quick release valve means and escape therethrough for releasing a brake application.

WALTER C. WRIGHT.